United States Patent
Durand et al.

(10) Patent No.: US 12,391,247 B2
(45) Date of Patent: Aug. 19, 2025

(54) METHOD FOR CONTROLLING A MOTOR VEHICLE EQUIPPED WITH AUTONOMOUS DRIVING MEANS

(71) Applicant: RENAULT S.A.S, Boulogne Billancourt (FR)

(72) Inventors: Bruno Durand, Paris (FR); Guillermo Pita-Gil, Versailles (FR); Salim Zair, Massy (FR)

(73) Assignee: AMPERE S.A.S., Boulogne Billancourt (FR)

( * ) Notice: Subject to any disclaimer, the term of this patent is extended or adjusted under 35 U.S.C. 154(b) by 313 days.

(21) Appl. No.: 18/004,998

(22) PCT Filed: Jun. 29, 2021

(86) PCT No.: PCT/EP2021/067894
§ 371 (c)(1),
(2) Date: Feb. 7, 2023

(87) PCT Pub. No.: WO2022/008304
PCT Pub. Date: Jan. 13, 2022

(65) Prior Publication Data
US 2023/0339460 A1  Oct. 26, 2023

(30) Foreign Application Priority Data
Jul. 10, 2020 (FR) .................... 20 07348

(51) Int. Cl.
*B60W 30/095* (2012.01)
*B60W 60/00* (2020.01)

(52) U.S. Cl.
CPC .... *B60W 30/0956* (2013.01); *B60W 60/0015* (2020.02); *B60W 60/0051* (2020.02); *B60W 2420/408* (2024.01); *B60W 2554/80* (2020.02)

(58) Field of Classification Search
CPC ......... B60W 30/0956; B60W 60/0015; B60W 2420/408; B60W 2554/80; B60W 30/12
See application file for complete search history.

(56) References Cited

U.S. PATENT DOCUMENTS 9,081,383 B1 * 7/2015 Montemerlo ........ G05D 1/0212
9,224,053 B1   12/2015 Ferguson et al.
(Continued)

FOREIGN PATENT DOCUMENTS

| EP | 3 318 946 A1 | 5/2018 |
| FR | 3 041 590 A1 | 3/2017 |

OTHER PUBLICATIONS

International Search Report issued Aug. 9, 2021 in PCT/EP2021/067894, citing documents 1-6 & 15-16 therein, filed on Jun. 29, 2021, 2 pages.

(Continued)

*Primary Examiner* — Peter D Nolan
*Assistant Examiner* — Anwar Mohamed
(74) *Attorney, Agent, or Firm* — Oblon, McClelland, Maier & Neustadt, L.L.P.

(57) ABSTRACT

A method controls a motor vehicle equipped with autonomous driving structure, sensors, fusion circuitry, and a road navigation assistance device. The method includes: determining a first value when the estimated trajectory of the vehicle intersects or approaches the central line of a traffic lane, determining a second value when the closest target object on the vehicle's driving line is also detected by a telemetry sensor, determining a third value when a collision will occur by comparing the distance between the closest target object and the vehicle to a predetermined threshold, determining a fourth value when the space between the vehicle and the closest target object is empty based on data from the telemetry sensor, and determining a fifth value when there is congestion on the trajectory of the vehicle, and (Continued)

then determining whether the autonomous driving structure can be activated based on only the first to fifth values.

10 Claims, 1 Drawing Sheet

(56) References Cited

U.S. PATENT DOCUMENTS

| | | |
|---|---|---|
| 9,684,836 B1 | 6/2017 | Ferguson et al. |
| 2017/0228604 A1* | 8/2017 | Ferguson .............. B60W 30/09 |
| 2018/0126986 A1 | 5/2018 | Kim et al. |
| 2018/0290686 A1 | 10/2018 | Minoiu Enache et al. |
| 2020/0070820 A1 | 3/2020 | Kim et al. |
| 2021/0094577 A1* | 4/2021 | Shalev-Shwartz .... B60W 40/02 |

OTHER PUBLICATIONS

French Preliminary Search Report issued Jun. 12, 2021 in FR 20 07348, filed on Jul. 10, 2020, citing documents 1-6 & 15-16 therein, 3 pages (with English Translation of Categories of Cited Documents).

* cited by examiner

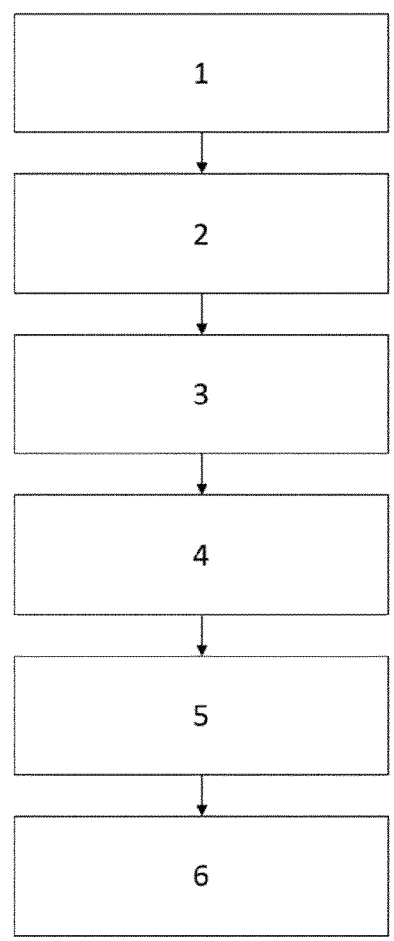

METHOD FOR CONTROLLING A MOTOR VEHICLE EQUIPPED WITH AUTONOMOUS DRIVING MEANS

TECHNICAL FIELD

The technical field of the invention is the control of a motor vehicle, and more particularly the control of an autonomous motor vehicle.

An autonomous vehicle must be able to switch from a passive mode in which the driver directs the vehicle to an active mode in which the autonomous vehicle directs itself alone, in total safety.

PRIOR ART

From the prior art, the document U.S. Ser. No. 10/181,084 is known, which describes a method comprising a number of control modules that are interconnected with one another and capable of combining the various data from the sensors embedded in the vehicle using a data merging algorithm, of estimating the risks of collision, of verifying the possibility of traveling in autonomous mode and of managing the appropriate maneuvers for the guidance of the vehicle while concatenating the information supplied by each module.

SUMMARY OF THE INVENTION

A subject of the invention is a method for controlling a motor vehicle provided with autonomous driving means, sensors comprising at least one telemetry sensor, means for merging data determined by the sensors and a road navigation assistance means with traffic management, the merging means being configured to determine an estimated trajectory of the motor vehicle, the position and the speed of at least one target object detected by the sensors around the motor vehicle, the markings of at least one traffic lane and the target object closest to the motor vehicle, the method comprising the following steps:
  a first value is determined if there is an intersection or a convergence between the estimated trajectory of the vehicle and the center line of at least one detected traffic lane,
  a second value is determined if the closest target object in the line of travel of the motor vehicle is also detected by the at least one telemetry sensor,
  a third value is determined if a collision will occur by comparing the distance between the closest target object and the motor vehicle with a predetermined threshold,
  a fourth value is determined if the space between the motor vehicle and the closest target object is empty as a function of the data from the at least one telemetry sensor, and
  a fifth value is determined if there is congestion on the trajectory of the vehicle, then
  a determination is made as to whether the autonomous driving means can be activated as a function only of the first to fifth values.

To determine if there is an intersection or a convergence between the estimated trajectory of the vehicle and the center line of at least one detected traffic lane, the following steps can be performed:
  the curvilinear abscissa of the point of intersection with each detected line, which is the distance from the motor vehicle traveled on the estimated trajectory, is estimated,
  for each point of the estimated trajectory, the ordinate deviation between this point and the corresponding point of each line is calculated,
  out of the determined deviations, a determination is then made as to whether a deviation is negative or zero,
  if such is the case, it is determined that an intersection will occur given the estimated situation, then
  a Boolean is determined as a function of the presence or not of an intersection.

To determine whether the target object closest in the line of travel of the motor vehicle is also detected by the at least one telemetry sensor, the following steps can be performed:
  a percentage coherence is determined between the target object derived from the merging step and the data from the at least one telemetry sensor, then
  a Boolean is determined as a function of the comparison of the percentage coherence with a predetermined value.

To determine the percentage coherence, the following steps can be performed:
  an occupancy grid is filled as a function of the data received from the at least one telemetry sensor, the occupancy grid being a meshing of cells visited by at least one telemetry sensor and contained within a two-dimensional space, substantially parallel to the plane of the road and including the motor vehicle, each cell taking an occupied state if a detected target is present at least partly in the cell, each cell taking another state if such is not the case, then
  the cells which correspond to the oriented rectangle of the target object are identified from the dimensions and the orientation of the target object determined in the merging step,
  a percentage coherence is then determined as a function of the states of the visited cells.

To eliminate false collision detections when the distance between the target object and the motor vehicle is above the predefined threshold but below a second predefined threshold, the following steps can be performed:
  a change-of-reference-frame method is applied by switching from the overall reference frame to a reference frame linked to the motor vehicle,
  a determination is then made as to whether at least one of the coordinates of the target object has a sign different from the other coordinates, then
  if such is the case, collision is determined.

To determine if the space between the motor vehicle and closest target object is empty, the following steps can be performed:
  the number of cells of the occupancy grid corresponding to a corridor of predefined width extending from the motor vehicle to the target object which are in the occupied state is determined,
  if at least one cell is in the occupied state, the curvilinear abscissa to the first occupied cell in the corridor is determined.

The curvilinear abscissa to the first occupied cell in the corridor can be determined only if the number of occupied cells is above a predefined threshold, in order to avoid false alarms.

The first, second, third, fourth and fifth values can be Boolean values.

Another subject of the invention is a system for controlling a motor vehicle provided with autonomous driving means, sensors comprising at least one telemetry sensor, means for merging data determined by the sensors and a road navigation assistance means with traffic management, the merging means being configured to determine an estimated trajectory of the motor vehicle, the position and the speed of at least one target object around the motor vehicle, the markings of at least one traffic lane and the closest target object. The control system comprises processing means and at least one memory, configured to perform the steps of a control method described above.

The at least one telemetry sensor can comprise a LIDAR system.

BRIEF DESCRIPTION OF THE DRAWINGS

Other aims, features and advantages of the invention will become apparent on reading the following description, given purely as a nonlimiting example and with reference to the attached drawing in which [FIG. 1] illustrates the main steps of a control method according to the invention.

DETAILED DESCRIPTION

The motor vehicle conventionally comprises a chassis supported by wheels and itself supporting a variety of equipment including a power train, braking means and a steering unit. The motor vehicle is equipped with sensors that make it possible to detect the objects around it, notably several types of telemetry sensors, for example of radar, LIDAR, sonar or camera type. A camera situated in the front-end position of the vehicle can also be envisaged.

The motor vehicle is also equipped with proprioceptive sensors such as a wheel odometer, a gyroscope, a steering wheel angle sensor and a rear wheel angle sensor. These sensors are used to estimate the kinematics of the motor vehicle, the linear speed, its orientation and its angular yaw speed.

The vehicle is provided with a computer comprising a processor, a random-access memory, a read-only memory, analog-digital converters, and various input and/or output interfaces. The read-only memory of the computer for its part stores a computing application, composed of computer programs comprising instructions, the execution of which by the processor allows the implementation by the computer of the control method described hereinbelow. Finally, by virtue of its output interfaces, the controller is able to transmit setpoints to the various members of the vehicle.

The vehicle is equipped with a data merging system which makes it possible to combine the detection data supplied by all the sensors to construct a map of all the targets in proximity to the motor vehicle, and accurately estimate their position and their speed. A target is understood to mean both an object and a vehicle. Such a multi-sensor merging system generally operates as follows.

Each sensor periodically transmits to the computer (with a period which is specific to it), all of the detected targets, and their measured kinematic attributes (e.g.: position and speed).

This list of detected targets is compared with the targets that exist in memory in the computer. Using data association methods (e.g.: the closest neighbors method), a calculation is made as to whether each measured target corresponds to one of the targets stored in memory. If such is the case, the kinematic attributes that are measured and those that are kept in memory are combined using temporal filtering techniques, for example by using Kalman filters. A scoring system is then used to weight each stored target: if a target already stored in memory is once again detected then its score increases, and if a target stored in memory is not detected while it is in the field of view of the sensor then its score decreases. Of the targets stored in memory, only those which have a sufficiently high score are validated. If one of the targets measured by the sensor does not correspond to any target kept in memory, then that measured target must be added to the list of the targets stored by the computer, and a zero score is assigned.

The main steps of the control method according to the invention, illustrated by the FIG. [FIG. 1], will now be described.

In a first step 1, called lane verification step, an intersection or a convergence between the estimated trajectory of the vehicle and the lines detected by the various sensors is identified. A line is understood to mean the center line of a traffic lane delimited by a marking on the ground. Likewise, the trajectory of the vehicle is likened to a line passing through the geometrical center of the vehicle.

For that, the curvilinear abscissa of the point of intersection with each detected line, which is the distance from the motor vehicle traveled on the estimated trajectory, is then estimated.

For each point of the estimated trajectory, the ordinate deviation between this point and the corresponding point of each line is calculated.

Of the determined deviations, a determination is then made as to whether a deviation is less than or equal to 0.

If such is the case, it is determined that an intersection will occur given the estimated situation. A Boolean is then determined as a function of the presence or not of an intersection.

In a second step 2, called target confirmation step, a determination is made as to whether the closest target in the line of travel of the motor vehicle, validated by the merging step, is also detected by the LIDAR. More specifically, a percentage coherence is determined between the target derived from the merging step and the data from the LIDAR, then a Boolean is determined as a function of the comparison of the percentage coherence p with a predetermined value. In another embodiment, such a percentage coherence is determined for sensors other than the LIDAR.

To determine said percentage coherence, an occupancy grid is filled as a function of the data received from the LIDAR. The occupancy grid is a two-dimensional space, substantially parallel to the plane of the road and comprising the motor vehicle. In order to fill the occupancy grid, a meshing of cells is determined. The size of the cells depends on the processing capacity and speed of the data processing means.

Each cell can take a state out of occupied, unknown and not visited.

A cell is in an occupied state if a detected target is present at least partly in the cell.

A cell is in an unknown state if it has been visited by the LIDAR but it is not occupied.

A cell is in a not visited state if it has not been visited by the LIDAR. This includes, for example, cells present in the shadow of a target closer to the motor vehicle.

Once the occupancy grid is determined, the cells which correspond to the oriented rectangle of the target are identified from the dimensions and the orientation of the target determined in the merging step A percentage coherence p is then determined as a function of the states of the identified cells by application of the following equation.

$$p = 100 * \frac{n_{occ} + n_{inc}}{n_{tot} - n_{nv}}$$

With:
$n_{occ}$: number of occupied cells
$n_{inc}$: number of unknown cells
$n_{tot}$: total number of cells
$n_{nv}$: number of cells not visited In a third step 3, called collision verification step, the distance between the center of the target and that of the motor vehicle is determined at each instant of the estimated trajectory and for each identified target.

This distance is then compared with a minimum distance threshold below which it is considered that a collision occurs.

To eliminate false alarms when the target is close to the motor vehicle (that is to say that the difference between the distance and the minimum threshold is positive but below a second threshold, low on the scale of the size of the vehicle), a change-of-reference-frame method is applied that makes it possible to switch from the overall reference frame of the environment to a local reference frame linked to the motor vehicle. A determination is then made as to whether at least one of the coordinates of the target has a sign different from the other coordinates. If such is the case, collision is determined.

If several collisions are identified, only the collision associated with the shortest time before impact is retained.

Finally, a Boolean is determined according to whether or not it is considered that a collision will occur.

In a fourth step 4, a determination is made as to whether the space between the motor vehicle and the target is not occupied in the occupancy grid determined as a function of the data from the LIDAR. More specifically, the number of cells of the occupancy grid corresponding to a corridor of predefined width extending from the motor vehicle to the target which are in the occupied state is determined.

If at least one cell is in the occupied state, the curvilinear abscissa to the first occupied cell in the corridor is determined.

In a particular embodiment, the curvilinear abscissa to the first occupied cell in the corridor is determined only if the number of occupied cells is above a predefined threshold, in order to avoid false alarms.

During a fifth step 5, a determination is made as to whether there is congestion on the trajectory of the vehicle, notably as a function of the data from road navigation assistance. A Boolean is then determined as a function of the presence or not of congestion.

During a sixth step 6, a determination is made as to whether the autonomous driving mode can be activated as a function of the data determined at the end of each of the steps 1 to 5. In one particular embodiment, the sixth step 6 is a combination of the Booleans determined in each step 1 to 5.

The control method has been described for a motor vehicle provided with a telemetry sensor of LIDAR system type. Nevertheless, other telemetry sensors can be employed in combination with or instead of the LIDAR system, such as a time-of-flight measurement system, a radar or an optical detection system.

The invention claimed is:

1. A method for controlling a motor vehicle provided with autonomous driving means, sensors comprising at least one telemetry sensor, means for merging data determined by the sensors and a road navigation assistance means with traffic management, the merging means being configured to determine an estimated trajectory of the motor vehicle, a position and a speed of at least one target object detected by the sensors around the motor vehicle, markings of at least one traffic lane and the target object closest to the motor vehicle, the method comprising the following steps:

determining a first value if there is an intersection or a convergence between the estimated trajectory of the vehicle and the center line of at least one detected traffic lane, determining a second value if the closest target object in the line of travel of the motor vehicle is also detected by the at least one telemetry sensor, determining a third value if a collision will occur by comparing a distance between the closest target object and the motor vehicle with a predetermined threshold, determining a fourth value if a space between the motor vehicle and the closest target object is empty as a function of the data from the at least one telemetry sensor, and determining a fifth value if there is congestion on the trajectory of the vehicle, then activating the autonomous driving means as a function only of the first to fifth values.

2. The control method as claimed in claim 1, wherein, to determine if there an intersection or a convergence between the estimated trajectory of the vehicle and the center line of at least one detected traffic lane, the following steps are performed:

a curvilinear abscissa of a point of intersection with each detected line, which is a distance from the motor vehicle traveled on the estimated trajectory, is estimated, for each point of the estimated trajectory, an ordinate deviation between this point and the corresponding point of each line is calculated, out of the determined deviations, a determination is then made as to whether a deviation is negative or zero, if such is the case, it is determined that an intersection will occur given the estimated situation, then a Boolean is determined as a function of a presence or not of an intersection.

3. The control method as claimed in claim 1, wherein, to determine whether the target object closest in the line of travel of the motor vehicle is also detected by the at least one telemetry sensor, the following steps are performed:

a percentage coherence is determined between the target object derived from the merging step and the data from the at least one telemetry sensor, then a Boolean is determined as a function of a comparison of the percentage coherence with a predetermined value.

4. The control method as claimed in claim 3, wherein, to determine the percentage coherence, the following steps are performed:

an occupancy grid is filled as a function of the data received from the at least one telemetry sensor, the occupancy grid being a meshing of cells visited by at least one telemetry sensor and contained within a two-dimensional space, substantially parallel to a plane of the road and including the motor vehicle, each cell taking an occupied state if a detected target is present at least partly in the cell, each cell taking another state if such is not the case, then the cells which correspond to an oriented rectangle of the target object are identified from the dimensions and an orientation of the target object determined in the merging step, and a percentage coherence is then determined as a function of the states of the visited cells.

5. The control method as claimed in claim 1, wherein, to eliminate false collision detections when the distance between the target object and the motor vehicle is above the predetermined threshold but below a second predetermined threshold, the following steps are performed:

a change-of-reference-frame method is applied by switching from an overall reference frame to a reference frame linked to the motor vehicle, a determination is then made as to whether at least one of coordinates of the target object has a sign different from the other coordinates, then if such is the case, collision is determined.

6. The control method as claimed in claim 4, wherein, to determine if the space between the motor vehicle and the closest target object is empty, the following steps are performed:

the number of cells of the occupancy grid corresponding to a corridor of predefined width extending from the motor vehicle to the target object which are in the occupied state is determined, if at least one cell is in the occupied state, a curvilinear abscissa to the first occupied cell in the corridor is determined.

7. The control method as claimed in claim 6, wherein the curvilinear abscissa to the first occupied cell in the corridor is determined only if the number of occupied cells is above a predefined threshold, in order to avoid false alarms.

8. The control method as claimed in claim 1, wherein the first, second, third, fourth and fifth values are Boolean values.

9. A system for controlling a motor vehicle provided with autonomous driving means, sensors comprising at least one telemetry sensor, means for merging data determined by the sensors and a road navigation assistance means with traffic management, the merging means being configured to determine an estimated trajectory of the motor vehicle, the position and the speed of at least one target object around the motor vehicle, the markings of at least one traffic lane and the closest target object, the control system comprising processing means and at least one memory, configured to perform the control method as claimed in claim 1.

10. The control system as claimed in claim 9, wherein the at least one telemetry sensor comprises a LIDAR system.

* * * * *